United States Patent [19]
Askins et al.

[11] Patent Number: 5,778,594
[45] Date of Patent: Jul. 14, 1998

[54] TWO DOOR ANIMAL TRAP

[75] Inventors: William E. Askins; Gary Roulston, both of Lititz; Joseph F. Fiore, Lebanon, all of Pa.

[73] Assignee: Woodstream Corporation, Lititz, Pa.

[21] Appl. No.: 658,228

[22] Filed: Jun. 4, 1996

Related U.S. Application Data

[63] Continuation-in-part of Ser. No. 600,160, Feb. 12, 1996.
[51] Int. Cl.[6] .......................... A01M 23/02; A01K 31/08
[52] U.S. Cl. ................................................ 43/61; 119/474
[58] Field of Search ................................... 43/60, 61, 58; 119/474, 498, 501

[56] References Cited

U.S. PATENT DOCUMENTS

| | | | |
|---|---|---|---|
| 1,054,564 | 2/1913 | Kline | 43/61 |
| 1,327,229 | 1/1920 | Erickson | 43/61 |
| 1,410,738 | 3/1922 | Dorseth | 43/61 |
| 1,453,795 | 5/1923 | Hovell | 43/61 |
| 2,167,291 | 7/1939 | Bowman | 43/61 |
| 2,692,453 | 10/1954 | Wingfield | 43/61 |
| 2,725,661 | 12/1955 | Bowman | 43/61 |
| 2,965,259 | 8/1960 | Johnson | |
| 3,834,063 | 9/1974 | Souza et al. | 43/61 |
| 3,896,766 | 7/1975 | Martin | |
| 3,913,258 | 10/1975 | Souza et al. | 43/60 |
| 3,975,857 | 8/1976 | Branson et al. | |
| 4,162,588 | 7/1979 | Wyant | |
| 4,484,540 | 11/1984 | Yamamoto | |
| 4,527,512 | 7/1985 | Sugiura | |
| 4,546,568 | 10/1985 | Seyler | |
| 4,557,067 | 12/1985 | Ha | |
| 4,567,688 | 2/1986 | McKee | |
| 4,604,823 | 8/1986 | Ponzo | 43/105 |
| 4,696,257 | 9/1987 | Neary et al. | |
| 4,762,085 | 8/1988 | Ondrasik | 119/17 |
| 4,829,700 | 5/1989 | Ha | |
| 4,899,484 | 2/1990 | Morin | 43/61 |
| 5,010,848 | 4/1991 | Rankin | 119/26 |
| 5,329,723 | 7/1994 | Liul | |
| 5,549,073 | 8/1996 | Askins et al. | |

FOREIGN PATENT DOCUMENTS 593752  2/1934  Germany .................. 43/61

OTHER PUBLICATIONS

Tomahawk Live Trap Company brochure; pp. 1–8 (1994).
Havahart Brochure from Woodstream; pp. 1–8 (1994).
R.C. Steele Catalogue, p. 4. (Spring, 1996).

*Primary Examiner*—Joseph J. Hail, III
*Attorney, Agent, or Firm*—Jacobson, Price, Holman & Stern, PLLC

[57] ABSTRACT

A cage-type animal trap has side walls which fold inwardly concertina-wise and end frames with sliding doors which fold up against the roof of the trap so that the trap can be collapsed into a compact package for storage and transportation. When the trap is opened out for use the end frames form braces rigidly supporting the side walls. A trigger mechanism on the roof of the trap holds both doors open so that an animal can enter the trap from either end. A pivotal trip pan in the base of the trap is connected by cables to the trigger mechanism. When an animal steps on the trip pan from either end, the trigger mechanism releases both doors which slide closed under gravity. The trap can optionally be operated with one of the doors remaining closed and can be provided in a non-collapsible version.

23 Claims, 6 Drawing Sheets

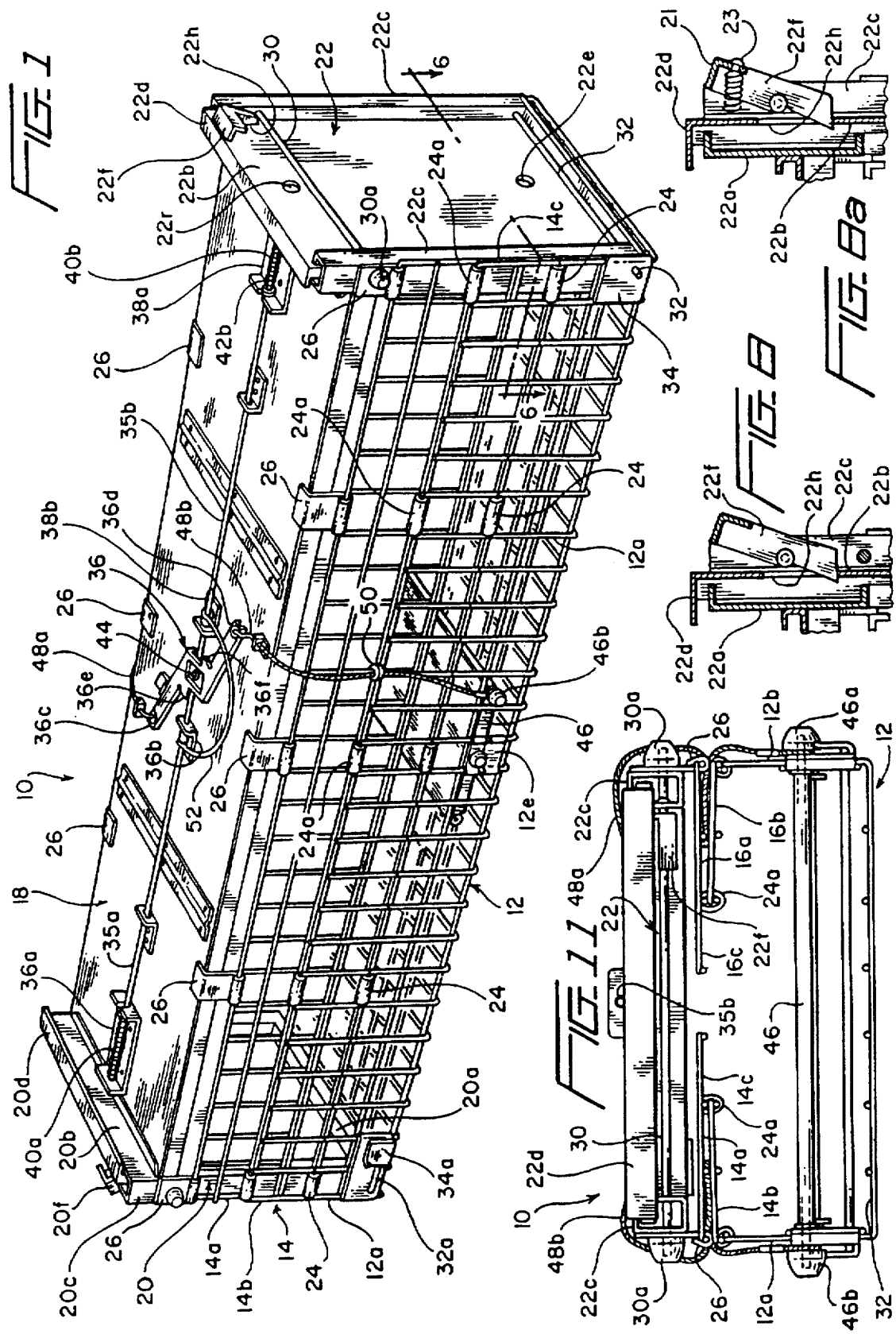

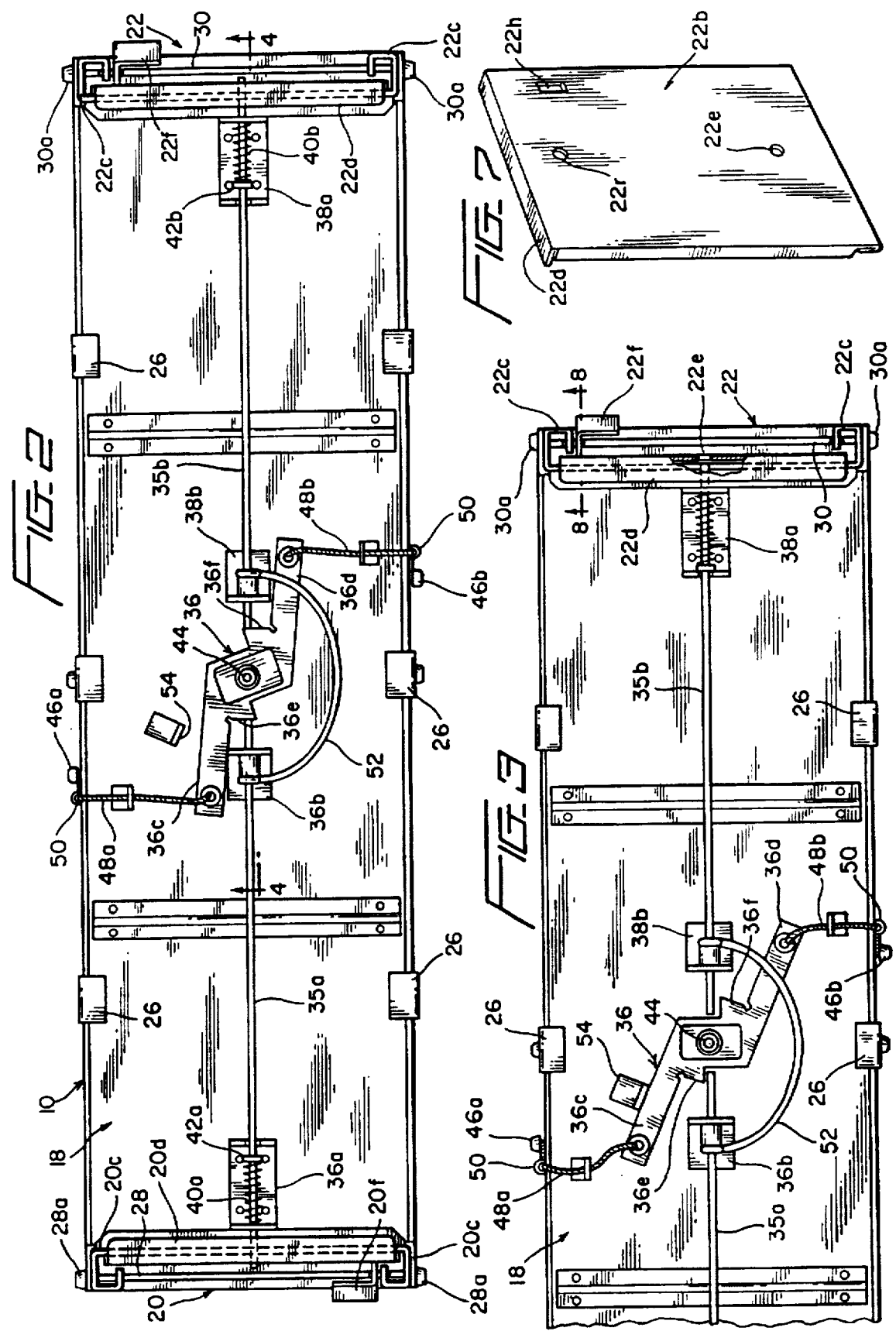

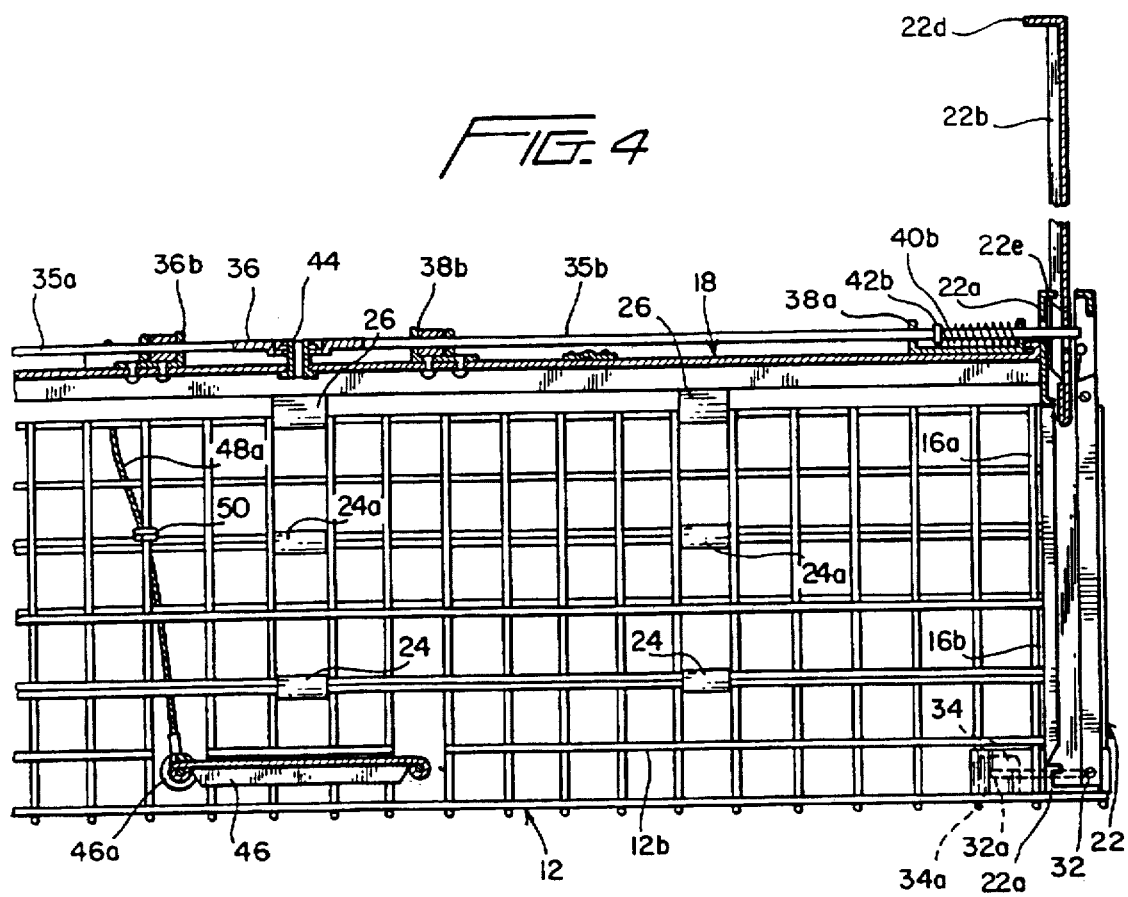
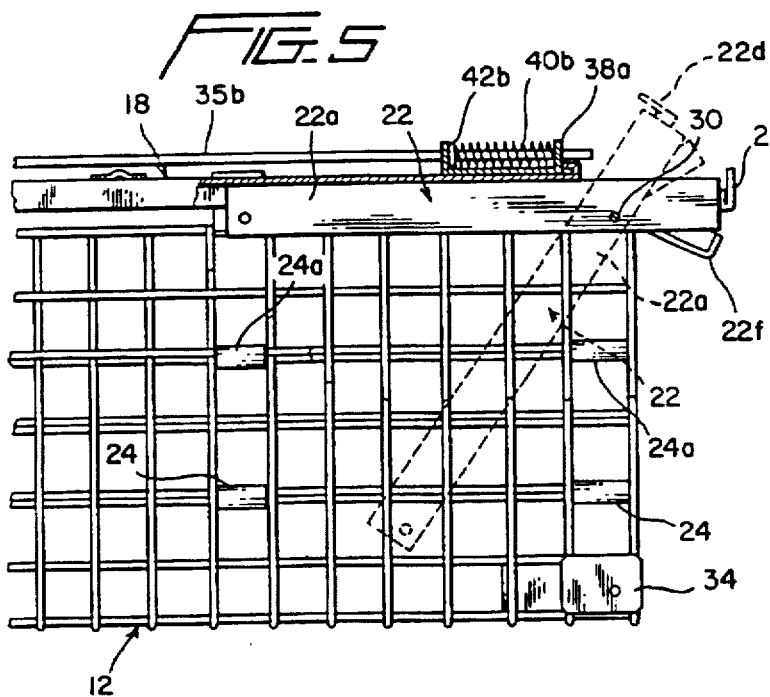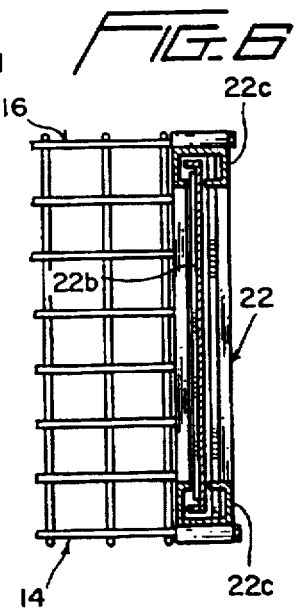

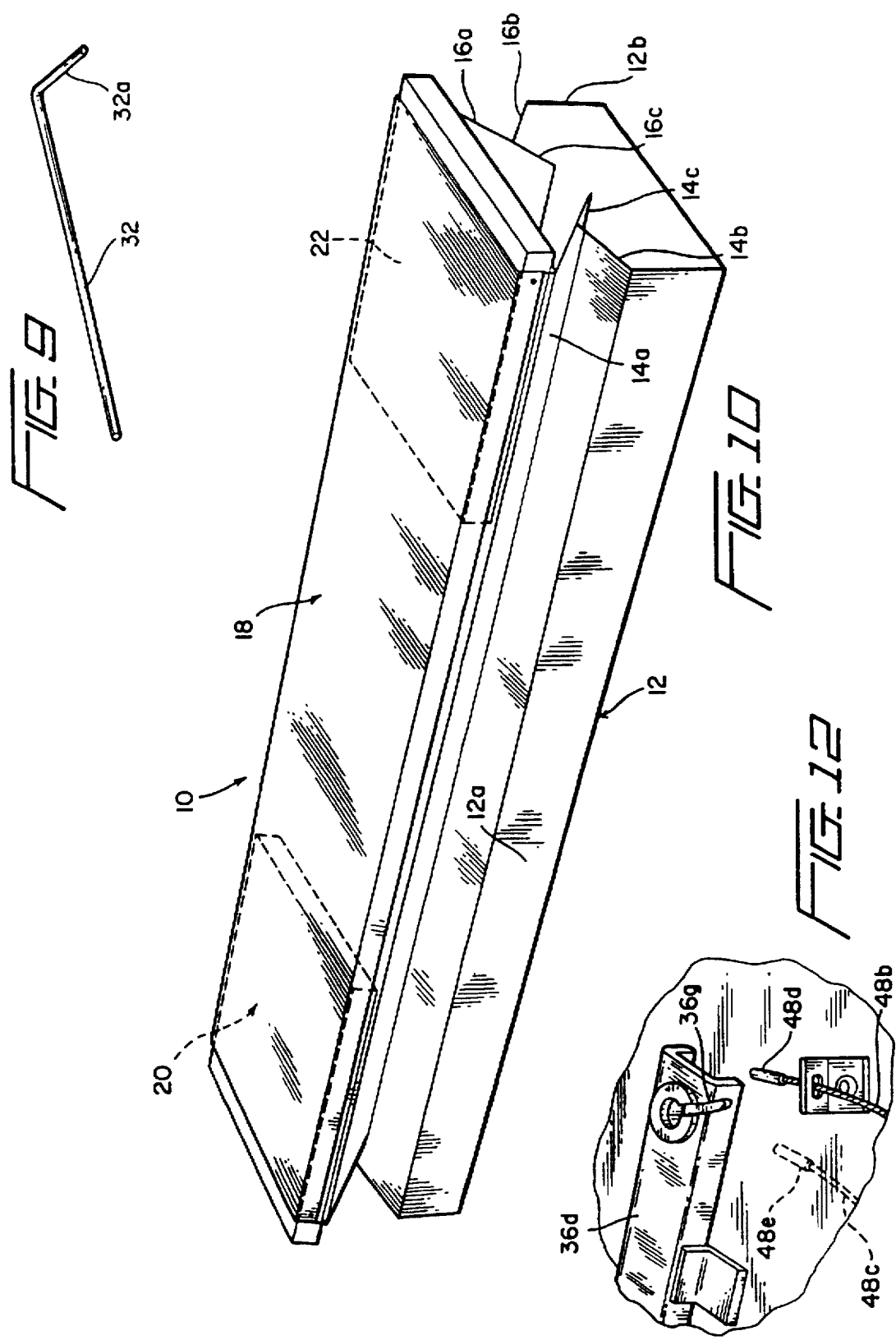

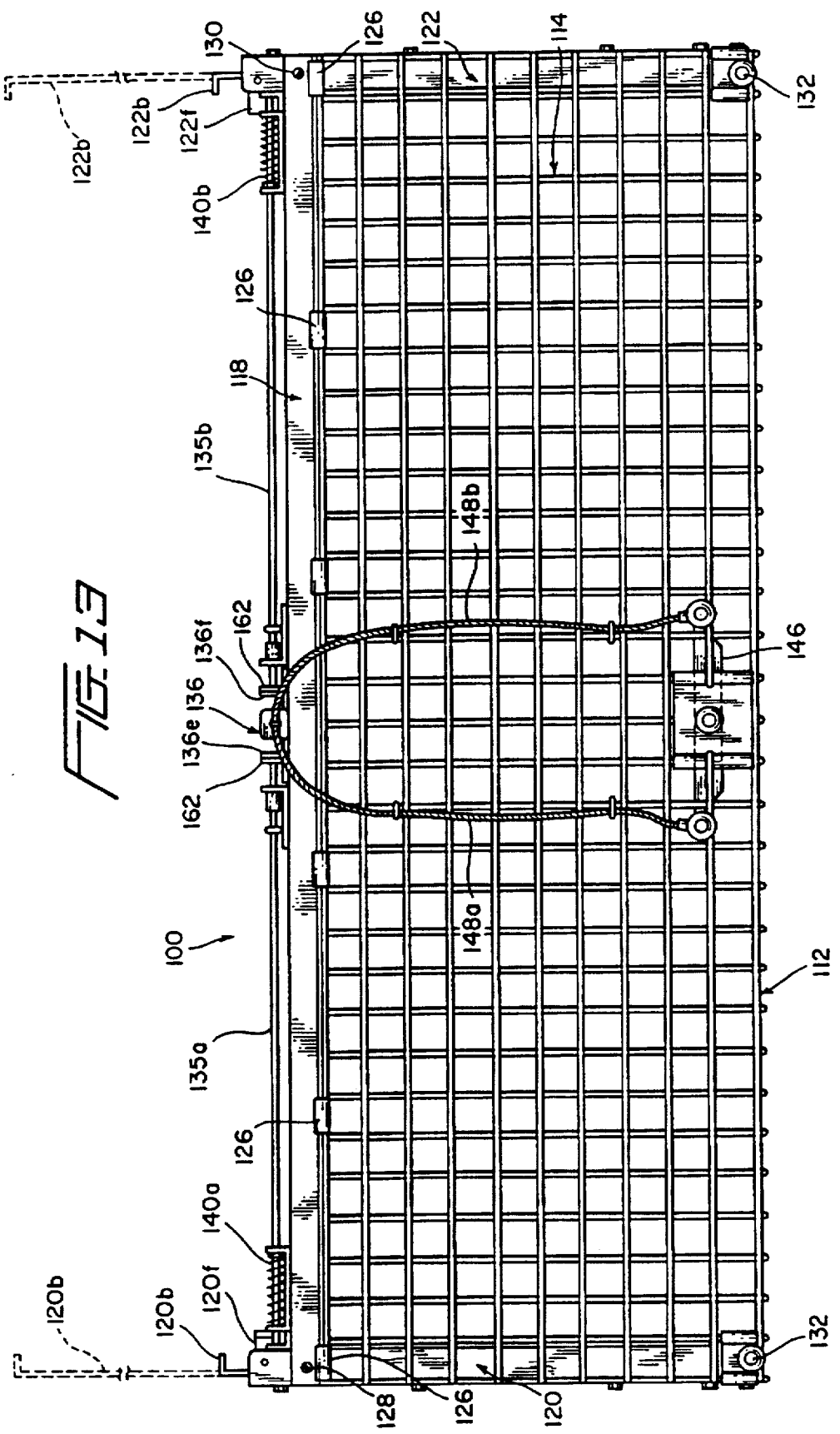

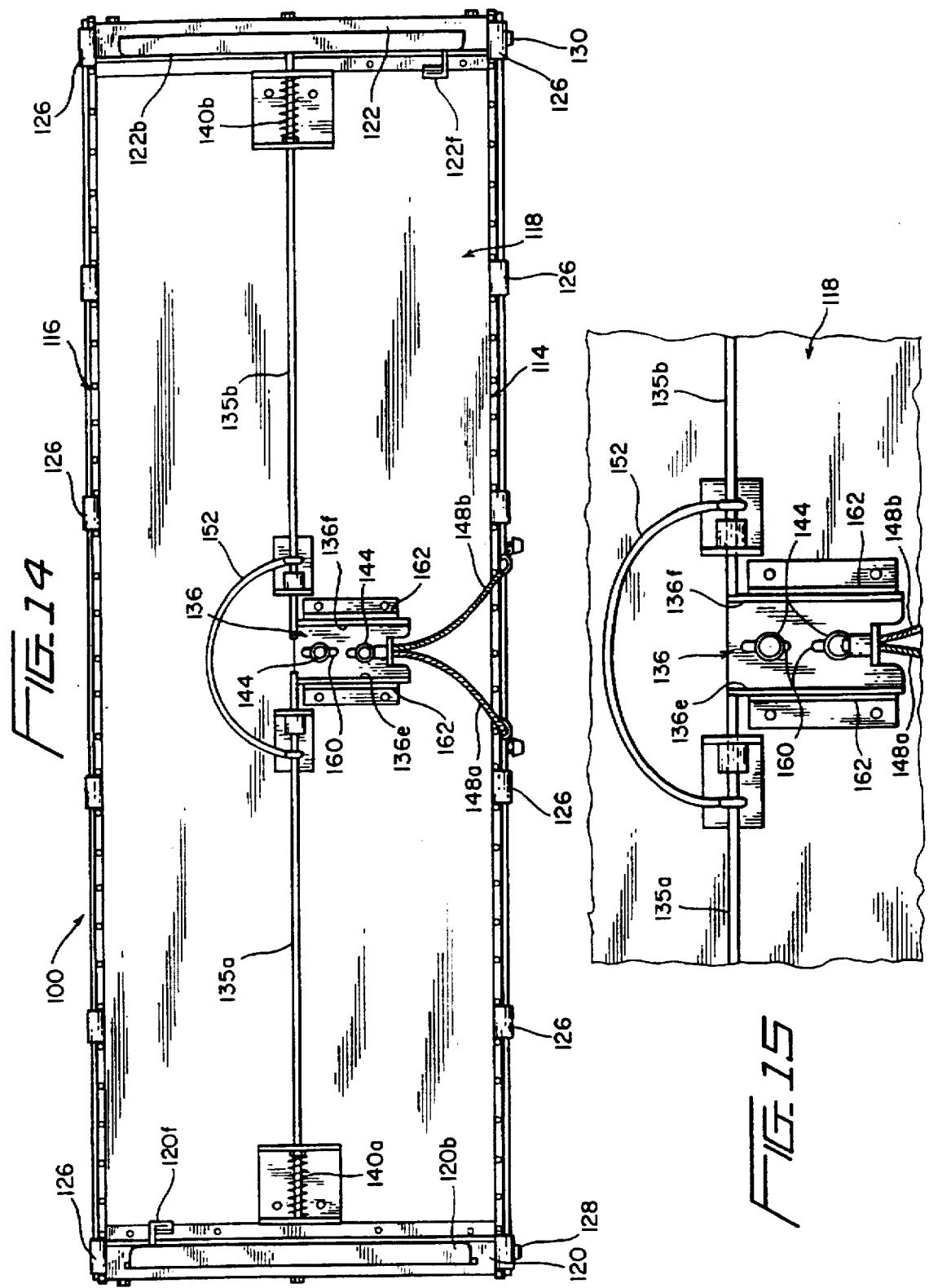

TWO DOOR ANIMAL TRAP

CROSS-REFERENCE TO RELATED APPLICATION

This application is a continuation-in-part of application Ser. No. 08/600,160 filed Feb. 12, 1996.

BACKGROUND OF THE INVENTION

This invention relates to cage-type animal traps used, typically, for trapping smallish animals, outdoors, in a humane manner without harming the animal, so that the animal may, for example, later be released, say at another location.

Cage traps which are presently in use tend to be of a rigid design, taking up space in warehouse storage, transportation, on store shelves, in users' homes, etc. A need exists for a cage-type trap that can fold into a compact package for storage and transportation, yet still be sufficiently durable and rigid when unfolded so that it is acceptable for professional field use in trapping animals.

SUMMARY OF THE INVENTION

It is an object of this invention to provide a cage-type trap of the kind described which can fold down into the footprint of its base to provide a more compact package for transportation and storage.

Another object of the invention is to provide a trap as aforesaid which has a door at each end of the trap, either or both of which doors can be used selectively to allow animal access to the trap, wherein the trap includes a trip mechanism for closing both doors simultaneously when an animal enters the trap or, alternatively, when one of the doors is kept closed and only the other door is used for animal access, the trip mechanism only closes the open door.

Other objects of the invention include, for example, the provision of a trap which is durable, reliable and user friendly, which is animal friendly and which traps the animal safely in a humane manner, and which can be manufactured in a cost-effective manner.

In accordance with the invention, at least in one of its aspects, an animal trap has a base, side walls, a roof and door frames with vertically slidable doors at its opposite ends. The base and side walls may be made of metal mesh, for example with one inch square mesh openings, while the roof, door frames and doors may be made of metal sheet. The side walls may each comprise upper and lower panels hinged together with the upper panel hinged to the roof and the lower panel hinged to the base, to allow inward concertina—like folding of the side walls enabling the roof to be collapsed downwardly onto the base. One panel of each side wall may be overlapped with the other panel along the hinge connection between the panels to prevent the panels from folding or kinking outwardly beyond the vertical. The door frames may be pivotally attached to opposite ends of the roof so that each door frame with its sliding door in place can swing up flat against the inside of the roof when the trap is to be collapsed, and swing down into a vertical position engaging the base and forming a rigid support for the side walls when the trap is erected. By this arrangement, effectively no additional supports are required to rigidify and support the side walls in the elevated position.

In accordance with another aspect of the invention, the doors slide vertically in the respective frames, when the trap is erected, between a lower, closed position and an upper, open or set position in which the doors project upwardly above the roof. A trigger mechanism is provided to hold the doors in the open position including a sprung rod for each door extending lengthwise along the outside of the roof from the door to a central rotary or translating cam member. When the doors are opened, the rods are slid outwardly somewhat, against spring pressure, until the outer end of each rod is inserted into an aperture in the bottom of the respective door. The central cam member has oppositely located cam surfaces which engage the inner ends of the rods and hold the rods in their outer positions against the spring pressure to hold the doors open.

Inside of the trap, pivotally connected to the base, there is provided a pivotal trip pan. Opposite ends of the trip pan are connected by cables, extending up the outside of the side walls, to the cam on the roof of the trap. By this arrangement, when an animal enters the trap from either end and steps on the trip pan, one or other of the cables will pull on the cam member causing it to move slightly and release the inner ends of the rods. Under spring pressure, the rods then slide inwardly, and their outer ends release the doors which slide down to their closed positions, thereby trapping the animal in the cage. The door frames may include releasable latches to lock the doors closed and prevent the trapped animal from lifting same. It is possible to arrange for one of the doors to be kept closed and to use only the other door for animal access to the trap. Further the cables which attach the trip pan to the cam member on the roof of the trap, may have quick-release connections with the cam member enabling the cables to be disconnected from the cam member and replaced by a single long cable to run from the trap to a remote location where it can be pulled by the user to spring the trap. Also, the doors can slide upwardly out of the end frames to facilitate release of trapped animals.

Additional features and advantages of the invention will become apparent from the ensuing description and claims read in conjunction with the attached drawings.

BRIEF DESCRIPTION OF THE DRAWINGS

FIG. 1 is a perspective view of a two-door cage trap according to the invention, shown in erected position with the doors closed;

FIG. 2 is a plan view of the trap showing a trigger mechanism on the roof of the trap holding the doors in an open set position;

FIG. 3 is a view similar to FIG. 2 of the right side of the trap showing the trigger mechanism after it has been sprung;

FIG. 4 is a sectional view on line 4—4 of FIG. 2;

FIG. 5 is an elevational view of the right side only of the trap showing one of the doors folded up against the inside of the roof enabling the trap to fold into a more compact package;

FIG. 6 is a sectional view on line 6—6 of FIG. 1;

FIG. 7 is a perspective view of a door for the trap;

FIG. 8 is a sectional view on line 8—8 of FIG. 3;

FIG. 8a is a view similar to FIG. 8, but showing a spring-actuation latch replacing the gravity latch;

FIG. 9 is a perspective view of a door-frame latching rod;

FIG. 10 is a somewhat diagrammatic perspective view of the trap while being collapsed into a more compact packaging;

FIG. 11 is an end view of the trap when collapsed;

FIG. 12 is an enlarged perspective view of part of a rotary cam member on the roof of the trap showing a quick-release cable connection;

FIG. 13 is a side elevational view of another two-door cage trap according to the invention;

FIG. 14 is a plan view of the second trap showing a trigger mechanism in the sprung position; and FIG. 15 is an enlarged plan view of the trigger mechanism in the set position.

DETAILED DESCRIPTION OF THE PREFERRED EMBODIMENTS

The cage-type trap 10 shown in FIGS. 1–12 comprises an elongated dish-shaped base 12, opposite side walls 14, 16, a roof 18 and door frame assemblies 20, 22 at opposite ends of the cage. The base and side walls are made of metal mesh, for example with 1 inch mesh openings, while the roof and door frame assemblies are made of metal sheet. The base has upstanding sides 12a, 12b, and the side walls have respective upper panels 14a, 16a and lower panels 14b, 16b. The lower panels of the side walls are hinged to the upstanding sides 12a, 12b of the base by tubular connectors 24. The upper panels are hinged to opposite sides of the roof by brackets 26 depending from the roof, the brackets having upturned ends journally receiving the uppermost bars of the side wall panels 14a, 16a. The upper and lower side wall panels are hinged together by further tubular connectors 24a, noting that the upper panels have internal overlap portions 14c, 16c arranged by hinging the uppermost bar of each lower panel to the second bar from the bottom of each upper panel. This arrangement allows the side walls to fold inwardly concertina-wise in order to collapse the roof down onto the base as shown in FIGS. 10 and 11. The overlaps 14c, 16c form stops preventing the side walls from folding or kinking outwardly beyond the vertical.

The door frame assemblies 20, 22 comprise surrounding frames 20a, 22a and sliding doors 20b, 22b. The frames have channel-like vertical side members 20c, 22c in which the side edges of the doors are slidably received. The door frame assemblies are hinged to opposite ends of the roof by transverse rods 28, 30 which pass through aligned apertures in the side members 20c, 22c and in the endmost ones of the brackets 26. The rods have end caps 28a, 30a. The arrangement of the parts is such that the door frame assemblies in their entirety can each be swung upwardly against the inside of the roof as shown in FIGS. 5, 10 and 11 to allow the trap to be collapsed. When the trap is to be used, the side walls are opened and the door frame assemblies are swung down into a vertical position wherein the bottom of each door frame assembly engages the inside of the base 12. The door frame assemblies thus form braces which themselves support the side walls in the erected position of the trap. Removable transverse rods 32, each of which has one end 32a bent with respect thereto, are provided for releasably locking the door frame assemblies to the base by insertion through aligned apertures at the bottom of the side members 20c, 22c and brackets 34 on the sides 12a, 12b of the base 12. The brackets have hook portions 34a to receive the bent ends 32a of the rods when inserted. In the down position of the door frame assemblies their top portions project somewhat above the roof of the trap.

The doors 20b, 22b can slide up and down in the door frame assemblies when the assemblies are in the down position, between open or set positions of the doors, as shown for example in FIG. 4 (only one door being shown) and closed or sprung positions, as shown, for example, in FIG. 1. The doors have top flanges 20d, 22d to assist in lifting the doors from the closed to the open position. In order to hold the doors in the open position until an animal enters the trap, a trigger mechanism, described below, is provided on top of the roof.

The trigger mechanism comprises a pair of lengthwise extending rods 35a, 35b and a central rotary cam member 36. The rods can slide lengthwise inwardly and outwardly in brackets 36a, 36b and 38a, 38b on the roof of the trap and suitable bearing bushes may be provided in conjunction with the brackets to facilitate rod movements. The rods are spring biased inwardly towards the rotary cam member by surrounding coil springs 40a, 40b inside brackets 36a, 38a which act between outer end walls of the brackets and collars 42a, 42b fixed on rods 35a, 35b. While holding the doors in the elevated, open position, the rods can be pushed outwardly against the springs 40a, 40b until the outer ends of the rods become inserted in apertures 20e, 22e at the bottom of the doors, (only aperture 22e is seen in the drawings) and the central cam member 36 can be rotated into a position in which the inner ends of the rods engage on cam surfaces 36e, 36f forming stops for the rods and preventing the springs from moving the rods inwardly, thus holding the rods in their outer positions and holding the doors 20b, 22b open. The setting operations for the doors are done in sequence, first setting one door (20b) open and then the other door (22b). To this end, as seen in FIGS. 2 and 3, cam surface 36e is somewhat longer than cam surface 36f. Thus, when the cam member 36 is rotated slightly anticlockwise from the position shown in FIG. 3, in order to set the inner end of rod 35a on cam surface 36e, there is sufficient clearance on the opposite side of the cam member so that the end of surface 36f does not interfere with the inner end of rod 35b and it is not necessary to move rod 35b outwardly while setting rod 35a. Then, to set rod 35b, it is moved outwardly while rotating the cam member slightly further in the anticlockwise direction (FIG. 2). The differential cam surface length arrangement also enables only the one door 20b to be used while leaving door 22b closed. The central cam member is rotatably secured to the roof of the trap by a pin 44, rivet or the like.

The sides 12a, 12b of base 12 carry centrally located plates 12e, on which is pivotally mounted a trip pan 46. Diagonally opposite corners of the trip pan have capped pins 46a, 46b extending out of the base and the pins are connected by cables 48a, 48b to oppositely extending arms 36c, 36d formed on the cam member 36. The cables extend up the outside of the side walls through guides 50 and accommodate the inward folding movements of the side walls.

When the rods 35a, 35b are set on the cam surfaces 36e, 36f and hold the doors open, the rotary cam member is in a position in which the cables set the trip pan in a neutral, substantially horizontal position (FIG. 4). When an animal enters the trap from either end and steps on either side of the trip pan, the trip pan pivots in one or other direction causing one or other of the cables 48a, 48b to pull on its respective cam member arm 36c, 36d thereby rotating the cam member somewhat, in a clockwise direction as illustrated. This movement causes the cam surfaces 36e, 36f to release the inner ends of the rods 35a, 35b which then spring inwardly towards the cam member so that the outer ends of the rods are released from the apertures 20e, 22e in the doors thereby allowing the doors to slide closed and trap the animal. The trip pan may be suitably baited to attract animals. To accommodate up and down pivotal movements of the trip pan pins 46a, 46b, one of the bars of the base may be cut away on each side to provide a vertically enlarged mesh opening.

To releasably latch the doors 20b, 22b in the closed position and prevent them from being raised by a trapped animal, the door frame assemblies have gravity latches 20f.

22f pivotally mounted near the top of the side frame members 20c, 22c outside of the doors. The latches are configured so that their lower ends are gravity biased to swing inwardly and engage in notches formed at the top of the doors when the doors are closed. See opening 22h in FIG. 8. The latches thus lock the doors in the closed position so that the doors can only be raised when the latches are reversely pivoted by a user from the outside of the trap.

In FIG. 8a the gravity latch has been replaced by a spring latch. Each of the parts seen in FIG. 8 is identical, except that a small spring 21 is secured to the latches by a pop rivet or the like 23 to normally bias the latches into their locking position.

The trap can be used with both doors set open or with only one door set open, the other door remaining closed as described above. It is noted that the doors have additional rod receiving apertures near the top. See, for example, aperture 22k in door 22. Either one of these apertures can be used to receive the outer end of a rod 35a, 35b when setting the opposite end door open, so that the inner ends of both rods can be suitably fitted on the cam surfaces 36e, 36f. The trap is provided with a carrying handle 52 journalled on the rods 35a, 35b, and a stop 54 limiting movement of the rotary cam member. To release a trapped animal either one of the doors can be lifted completely out of the respective end frame by releasing the respective gravity latch 20f or 22f. FIG. 12 shows how cable 48b can be disconnected from arm 36d of the rotary cam member so that a further long cable 48c can be used in its place to spring the trap from a remote location. The cables each have barreled ends 48d and 48e and the arm 36d is slit at 36g to accept either barreled end as a quick release and connect coupling. Arm 36c of the cam member has a similar connection (not shown) with cable 48a. For remote operation, both cables 48a and 48b are disconnected and cable 48c is connected to the cam member.

FIGS. 13–15 show a second embodiment two-door trap 100 according to the invention in which the rotary cam member 36 of the first embodiment is replaced by a translatory or "straight pull" cam member 136.

In the second embodiment, the trap has a main body portion comprising a base 112 and side walls 114, 116 formed from a single sheet of metal mesh bent into a substantial U-shape to provide a non-collapsible version of the trap. It is understood, however, that the second embodiment can be provided with folding side walls as in the first embodiment and likewise the first embodiment can be provided with non-folding side walls as in the second embodiment. The tops of the side walls 114, 116 are again secured to a sheet metal roof 118 by curled brackets 126 similar to the brackets 26 in the first embodiment.

Trap 100 has end frames 120, 122 which again accommodate vertically sliding doors 120b, 122b operating in like manner to the doors in the first embodiment and which also can be completely removed, upwardly, from the end frames to release a trapped animal. Gravity latches 120f and 122f are again provided to lock the doors in the closed position, this time, however, the latches being situated on the insides rather than on the outsides of the respective doors. In the non-collapsible version of trap 100 (as illustrated) the end frames can be fixed in the opposite ends of the trap body. In the collapsible version, however, the end frames can again swing inwardly against the roof of the trap about pivot rods 128, 130, and rods 132 at the base of the trap can again be removable.

The trigger mechanism on the roof 118 of trap 100, again comprises elongate rods 135a, 135b urged inwardly by coil springs 140a, 140b and which can be set in like manner to the first embodiment in apertures (not shown) at the bottoms of doors 120b, 122b, when the doors are opened, by pushing the rods out against the spring action and holding them out by engaging the inner ends of the rods against cam member 136.

Cam member 136 is secured to roof 118 by rivets 144 located in slots 160 in the cam member which allows the cam member to slide laterally across the roof somewhat, as determined by the length of the slots. The cam member has upwardly turned side walls 136e, 136f defining cam surfaces for the inner ends of rods 135a, 135b, and the cam slides between guides 162.

The trap is set by pushing the cam member 136 across the roof towards the top in FIG. 14 so that the inner ends of the rods 135a, 135b are held against the cam surfaces 136e, 136f (FIG. 14). Again, surface 136f is longer than surface 136e, so that rod 135b and door 122b can be set first with clearance being provided between cam surface 136e and the inner end of rod 135a. Rod 135a and door 120b can then be set by further lateral movement of the cam member, or door 120a can be left closed if only one door of the trap is to be used.

To spring the trap, cables 148a and 148b extend from the cam member to opposite ends of a pivotal trip pan 146 in the base of the trap. When an animal steps on either side of the trip pan, the trigger mechanism is released. There can again be a quick-release coupling between the cables and the cam member so that the cables can be replaced by a single long cable for remote operation. The trap is again provided with a carrying handle 152.

While only preferred embodiments of the invention have been described herein in detail, the invention is not limited thereby and modifications can be made within the scope of the attached claims. For example, the folding structure of the side walls and door frame assemblies can be used in animal cages other than traps.

We claim:

1. An animal trap comprising a cage including a base, a pair of opposite side walls, a pair of end frames and a roof, each side wall comprising an upper panel and a lower panel, the upper panel being hinged to one side of the roof, the lower panel being hinged to one side of the base, the upper and lower panels of each side wall having a hinge connection therebetween whereby the side walls can fold inwardly about the hinge connections concertina-wise to collapse the roof onto the base, the end frames being pivotally connected to opposite ends of the roof respectively for pivotal movement between folded positions in which the end frames are substantially flat against opposite end sections of the roof inside of the cage to permit inward folding of the side walls and unfolded positions in which lower edge surfaces of the end frames engage the base and the end frames form ridge braces holding the cage in an extended open-out condition and preventing inward folding of the side walls about the hinge connections, at least one of the end frames including an animal access door, said animal access door being slidable in said at least one of the end frames between an elevated open position and a lower closed position, the trap including a trigger mechanism for realeasably holding the door in the open position and a release device inside of the trap connectable to the trigger mechanism for moving the trigger mechanism to release the door and allow the door to slide under gravity to the closed position when the release device is activated by an animal on entering the trap, the release device comprising a pivotal trip pan on the base of the cage inside of the trap, the trigger mechanism being located on top of the roof of the cage, and the trip pan being connectable to the trigger mechanism by a cable extending up one side of the cage.

2. A cage as claimed in claim 1, wherein the trigger mechanism comprises a movable cam member on the roof of the cage connectable to the trip pan by said cable, a lengthwise extending lengthwise movable rod on the roof having an outer end for engaging in an aperture in a bottom part of the door to hold the door in the elevated open position and the rod having an inner end for engaging on a cam surface of the cam member to hold the rod in an outer position wherein the outer end of the rod engages in said aperture, the trigger mechanism further including a spring urging the rod inwardly towards the cam member so as to disengage the outer end of the rod from said aperture and release the door to slide closed under gravity when the inner end of the rod is disengaged from said cam surface by movement of the cam member caused by the cable pulling on the cam member.

3. A cage as claimed in claim 2 wherein the other of said end frames includes a further slidable animal access door, wherein the trigger mechanism includes a further lengthwise extending rod on the roof of the cage having an outer end for engaging in an aperture in a bottom portion of the further door to hold the further door in an elevated open position, the further rod having an inner end for engaging on a second cam surface on the cam member to hold the further rod in an outer position wherein the outer end of the further rod engages in said aperture in the further door, and a further spring urging said further rod inwardly towards the cam member so as to disengage the further rod from the further door and release the further door for closing responsive to movement of the cam member as aforesaid.

4. A cage as claimed in claim 3 including gravity or spring-operated pivotal latches carried by the respective end frames for engaging notches in the respective doors and releasably locking the doors in closed position preventing the doors from being lifted by an animal trapped in the cage.

5. A cage as claimed in claim 1, wherein the base and side walls comprise metal mesh elements and the roof and end frames including said door comprise sheet metal elements.

6. An animal trap comprising a base, a roof, a pair of opposite side walls for closing opposite sides of the trap and a pair of opposite end frame closures at opposite ends of the trap, at least one of said end frame closures including an animal access door slidable in the end frame closure between an elevated open position allowing an animal to enter the trap and a lower closed position trapping the animal inside of the trap, a trigger mechanism on the roof of the trap for releasably holding the door in the elevated position and a release device connected to the trigger mechanism for moving the trigger mechanism to release the door and allow the door to slide under gravity to the closed position when the release device is activated, the trigger mechanism comprising a movable cam member on the roof of the trap connected to the release device, a lengthwise movable rod on the roof of the trap extending between the door and the movable cam member, the rod having an outer end for engaging in an aperture in a bottom part of the door to hold the door in the elevated position and the rod having an inner end for engaging on a cam surface of the movable cam member to hold the rod in an outer position wherein the outer end of the rod engages in said aperture, the trigger mechanism further including a spring urging the rod inwardly towards the cam member so as to disengage the outer end of the rod from said aperture and release the door to slide closed under gravity when the inner end of the rod is disengaged from said cam surface by movement of the cam member caused by activation of the release device.

7. An animal trap as claimed in claim 6 wherein the other of said end frame closures includes a further slidable animal access door, wherein the trigger mechanism includes a further lengthwise moveable rod on the roof of the trap extending between the cam member and the further door, the further rod having an outer end for engaging in an aperture in a bottom portion of the further door to hold the further door in an elevated position, the further rod having an inner end for engaging on a second cam surface on the cam member to hold the further rod in an outer position wherein the outer end of the further rod engages in said aperture in the further door, and a further spring urging the further rod inwardly towards the cam member so as to disengage the further rod from the further door and release the further door for closing responsive to movement of the cam member when activated by the release device.

8. An animal trap as claimed in claim 7 wherein the release device comprises a trip pan pivotally mounted in the base of the trap for pivotal movements in reverse directions dependent on which side of the trip pan is depressed by an animal and wherein opposite ends of the trip pan are each connected to the movable cam member by respective connectors adapted to pull on the movable cam member and effect movement thereof for releasing the inner ends of said rods from the respective cam surfaces irrespective of which side of the trip pan is depressed.

9. An animal trap as claimed in claim 8 wherein the end frame closures are mounted for inward folding against the roof of the trap and the side walls are foldable inwardly concertina-wise for collapsing the roof of the trap onto the base and wherein said connectors comprise cables extending up the side walls to accommodate inward folding of the side walls.

10. An animal trap as claimed in claim 8 wherein the cam member comprises a rotary cam member, wherein the cam surfaces comprise oppositely disposed curved surfaces on the cam member and the cam member includes opposed arms adjacent to the respective cam surfaces and attached to the respective connectors.

11. An animal trap as claimed in claim 10 wherein the connectors comprise cables having releasable connections with the respective arms for disconnection of the cables from the arms and attachment to one of the arms of a single long cable for remotely activating the trigger mechanism.

12. An animal trap as claimed in claim 8 wherein the movable cam member comprises a translatory cam member movable laterally across the roof of the trap, wherein the connectors comprise cables extending from opposite ends of the trip pan respectively and attached to a common connection point on one side of the cam member.

13. An animal trap as claimed in claim 12 wherein the cables have a releasable connection with the cam member to facilitate replacement thereof by a single long cable for remotely activating the trigger mechanism.

14. An animal trap as claimed in claim 7 wherein the cam surfaces are of different lengths respectively so that the inner end of one of said rods can be engaged on a respective one of the cam surfaces while clearance is provided between the inner end of the other of said rods and the other cam surface.

15. An animal trap as claimed in claim 6 wherein the base and side walls comprise metal mesh elements and wherein the roof and end frame closures including said door comprise sheet metal elements.

16. An animal trap as claimed in claim 6 including a gravity or spring-operated pivotal latch carried by said at least one of the end frame closures for engaging a notch in the door and releasably locking the door in the closed position preventing the door from being lifted by a trapped animal inside of the trap.

17. An animal trap as claimed in claim 6 wherein the movable cam member comprises a rotary cam member.

18. An animal trap as claimed in claim 6 wherein the movable cam member comprises a translatory cam member movable laterally across the roof of the trap.

19. An animal trap comprising a base, a roof, a pair of opposite side walls for closing opposite sides of the trap and a pair of opposite end frame closures at opposite ends of the trap, at least one of said end frame closures including an animal access door, a trigger mechanism on the roof of the trap for releasably holding the door in an open position, and a trip pan inside of the trap connected to the trigger mechanism by a cable connector for moving the trigger mechanism to release and close the door when the trip pan is depressed by an animal entering the trap, wherein the cable connector has a releasable attachment with the trigger mechanism for disconnecting the cable connector from the trigger mechanism and replacing same by a long cable for activating the trigger mechanism from a remote location.

20. An animal trap as claimed in claim 19, said animal access door being slidable in the respective end frame structure between an elevated open position and a lower closed position, said trigger mechanism comprising a movable cam member on the roof of the trap to which the cable connector is attached, a lengthwise movable rod on the roof of the trap extending between the door and the cam member, the rod having an outer end for engaging in an aperture in a bottom part of the door to hold the door in the elevated position and the rod having an inner end for engaging on a cam surface of the cam member to hold the rod in an outer position wherein the outer end of the rod engages in said aperture, the trigger mechanism further including a spring urging the rod inwardly towards the cam member so as to disengage the outer end of the rod from said aperture and release the door to slide closed under gravity when the inner end of the rod is disengaged from said cam surface by movement of the cam member caused by pulling on the cable connector or long cable.

21. An animal trap as claimed in claim 20 wherein the door is slidable upwardly out of the respective end frame closure to facilitate removal of an animal from the trap.

22. An animal trap as claimed in claim 20 wherein said releasable attachment comprises a barreled end on the cable connector fitting in a slot in the movable cam member.

23. A collapsible animal trap comprising a cage including a base, a pair of opposite side walls, a pair of end members, and a roof together defining a housing, each side wall comprising an upper panel and a lower panel, the upper panel being hinged to one side of the roof, the lower panel being hinged to one side of the base, hinge connections pivotally interconnecting the upper and lower panels of each side wall whereby the side walls can fold inwardly about the hinge connections concertina-wise to collapse the roof onto the base, the end members being pivotally connected to elements at opposite ends of the housing, respectively, for pivotal movement between folded positions in which the cage is collapsed and the end members are substantially flat inside of the housing to permit inward folding of the side walls, and unfolded positions in which the cage is erected and inward folding of the side walls about the hinge connections is precluded,

- at least one of the end frames including an animal access door, said animal access door being movable between an open position and a closed position,
- and a release device connectable to the trigger mechanism for moving the trigger mechanism to release the door and allow the door to move to the closed position when the release device is activated by an animal on entering the trap,
- the release device comprising a trip pan pivotally supported on the base inside of the housing with portions of the pivotal support located outside of the housing, the trigger mechanism including portions located outside of the housing, and the respective portions of the pivotal support of the trip pan and the trigger mechanism located outside of the housing being operatively connected to each other by an actuating means comprising a flexible cable extending outside of the housing.

* * * * *